United States Patent
You et al.

(10) Patent No.: US 6,817,632 B1
(45) Date of Patent: Nov. 16, 2004

(54) FLEX TUBE JOINT WITH TORSION RELIEF

(75) Inventors: Tao You, Madison, WI (US); Timothy M. Doyle, Madison, WI (US)

(73) Assignee: Fleetguard, Inc., Nashville, TN (US)

( * ) Notice: Subject to any disclaimer, the term of this patent is extended or adjusted under 35 U.S.C. 154(b) by 3 days.

(21) Appl. No.: 10/242,883

(22) Filed: Sep. 13, 2002

(51) Int. Cl.[7] ................................................. F16L 27/00
(52) U.S. Cl. ....................... 285/282; 285/903; 285/404; 285/276
(58) Field of Search ............................... 285/903, 401, 285/404, 276, 282

(56) References Cited

U.S. PATENT DOCUMENTS

| | | | |
|---|---|---|---|
| 2,898,941 A | 8/1959 | Kilcup | |
| 3,330,303 A | 7/1967 | Fochler | |
| 3,743,328 A | 7/1973 | Longfellow | |
| 4,050,721 A | 9/1977 | Streit | |
| 4,082,327 A | * 4/1978 | Sting et al. | 285/401 |
| 4,106,967 A | 8/1978 | Logan et al. | |
| 4,141,576 A | * 2/1979 | Lupke et al. | 285/903 |
| 4,222,594 A | 9/1980 | Skinner | |
| 4,303,104 A | 12/1981 | Hegler et al. | |
| 4,420,019 A | 12/1983 | Dillon | |
| 4,437,691 A | 3/1984 | Laney | |
| 4,487,232 A | 12/1984 | Kanao | |
| 4,758,023 A | * 7/1988 | Vermillion | 285/401 |
| 4,865,362 A | * 9/1989 | Holden | 285/903 |
| 5,039,011 A | 8/1991 | Parker | |
| 5,056,834 A | * 10/1991 | Scott et al. | 285/903 |
| 5,058,934 A | 10/1991 | Brannon | |
| 5,228,479 A | 7/1993 | Thomas | |
| 5,393,260 A | 2/1995 | Barth | |
| 5,494,319 A | 2/1996 | Thomas | |
| 5,727,599 A | 3/1998 | Fisher et al. | |
| 5,765,880 A | * 6/1998 | Goddard | 285/903 |
| 5,837,083 A | * 11/1998 | Booth | 156/158 |
| 5,842,727 A | * 12/1998 | Shade | 285/903 |
| 6,161,591 A | 12/2000 | Winter et al. | |
| 6,186,182 B1 | 2/2001 | Yoon | |

* cited by examiner

Primary Examiner—David Bochna
(74) Attorney, Agent, or Firm—Andrus, Sceales, Starke & Sawall, LLP

(57) ABSTRACT

Connector tubing is provided by a pair of nested corrugated spiral flex tubes twistable relative to each other about an axis at a flex tube joint to provide torsion relief.

8 Claims, 3 Drawing Sheets

FLEX TUBE JOINT WITH TORSION RELIEF

BACKGROUND AND SUMMARY

The invention relates to flexible connector tubing, and more particularly to a flex tube joint providing torsion relief.

Connector tubing provided by flex tubes have various ducting and exhaust applications where the inlet and outlet are not aligned or otherwise have a tortuous flow path therebetween. It is common to provide spiral flex tubes for such applications.

It has been found that a significant cause of failure in flexible connector tube applications is torsional twisting of the flex tubes relative to each other. The twisting causes cracking or fracture of the tubes and/or the joint therebetween. The present invention addresses and solves this problem of torsion causing damage to the flex tubes. The present invention provides torsion relief by allowing the flex tubes to twist relative to each other, thus reducing torsion to a minimum. This extends the life expectancy of the flex tubes.

DETAILED DESCRIPTION

Figure 1:
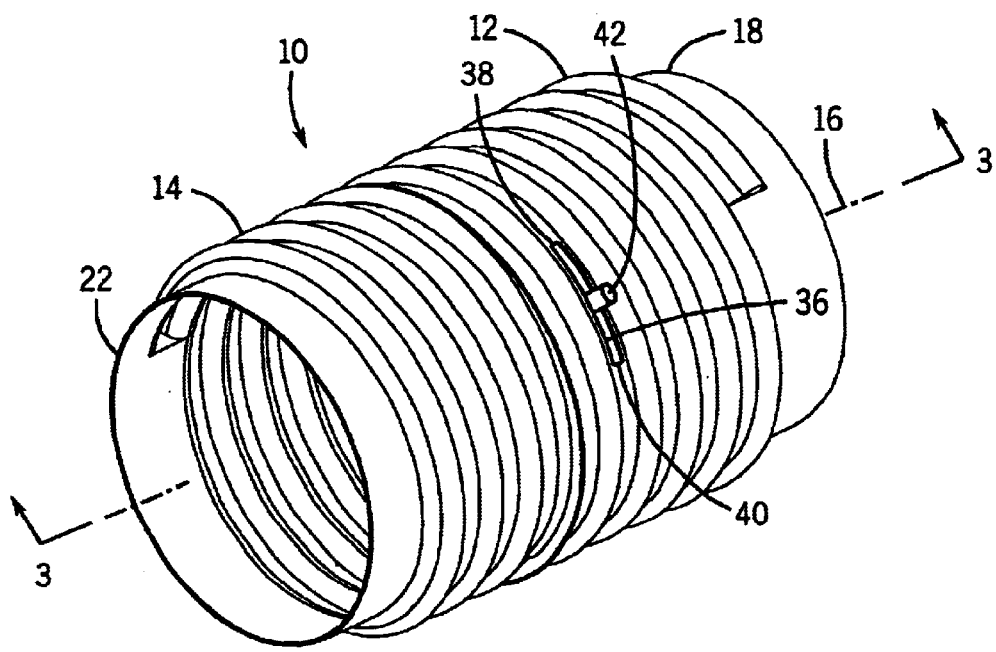
FIG. 1 is a perspective view of connector tubing showing a flex tube joint in accordance with the invention.

FIG. 1 shows connector tubing 10 including a pair of nested corrugated spiral flex tubes 12 and 14 extending along an axis 16. Tube 12 extends between first and second ends 18 and 20, FIGS. 2, 4. Tube 14 extends between first and second ends 22 and 24. Ends 18 and 22 are distally axially spaced from each other, FIGS. 1, 3 for connection to a respective inlet and/or outlet. The tubes are axially overlapped at 26, FIG. 3, in nested relation at ends 20, 24, and are twistable relative to each other about axis 16 at such overlap 26 to provide torsion relief.

Figure 3:
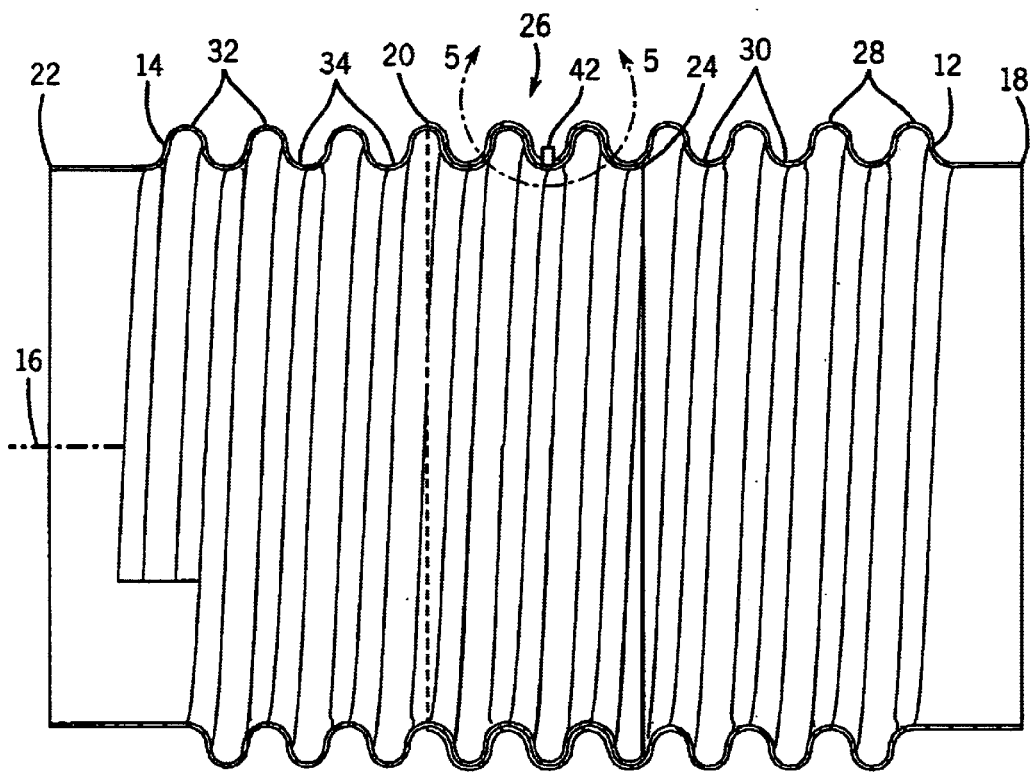
FIG. 3 is a sectional view taken along line 3—3 of FIG. 1.
Figure 4:
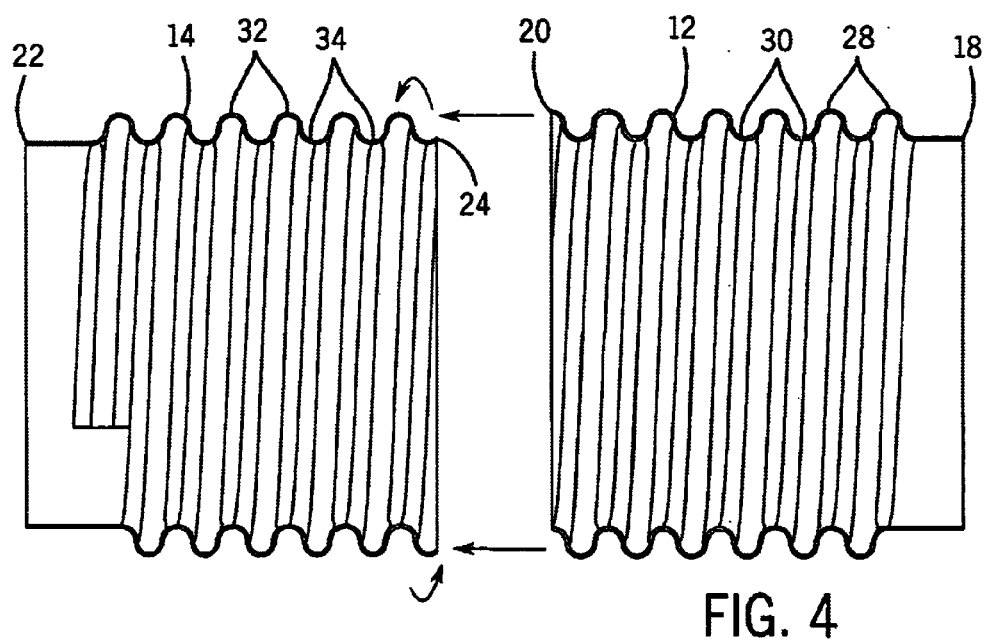
FIG. 4 is like FIG. 3 but showing a pre-assembled condition.
Figure 5:
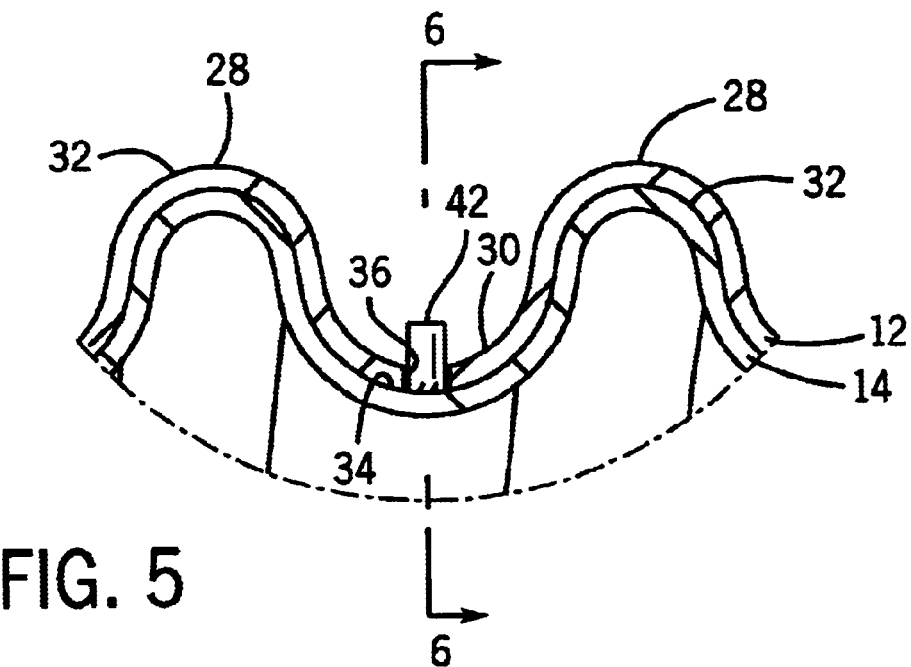
FIG. 5 is an enlarged view of a portion of FIG. 3 as shown at line 5—5.

Each tube is corrugated between peaks and valleys, for example peaks 28 and valleys 30 of tube 12, FIG. 4, and peaks 32 and valleys 34 of tube 14. Tubes 12 and 14 may rotate relative to each other about axis 16 such that the peaks and valleys of tube 12 arcuately slide along the peaks and valleys of tube 14 at overlap 26, FIG. 3, to permit twisting of the tubes relative to each other and provide the noted torsion relief. Each peak and each valley of tube 12 at the noted overlap region 26 flushly abuts each respective peak and valley of tube 14 at such overlap region 26 with no radial gap therebetween. This is desired for sealing and integrity of the joint. The tubes are spiraled in the same spiral direction and are nested in screw-in relation at overlap 26.

Figure 2:
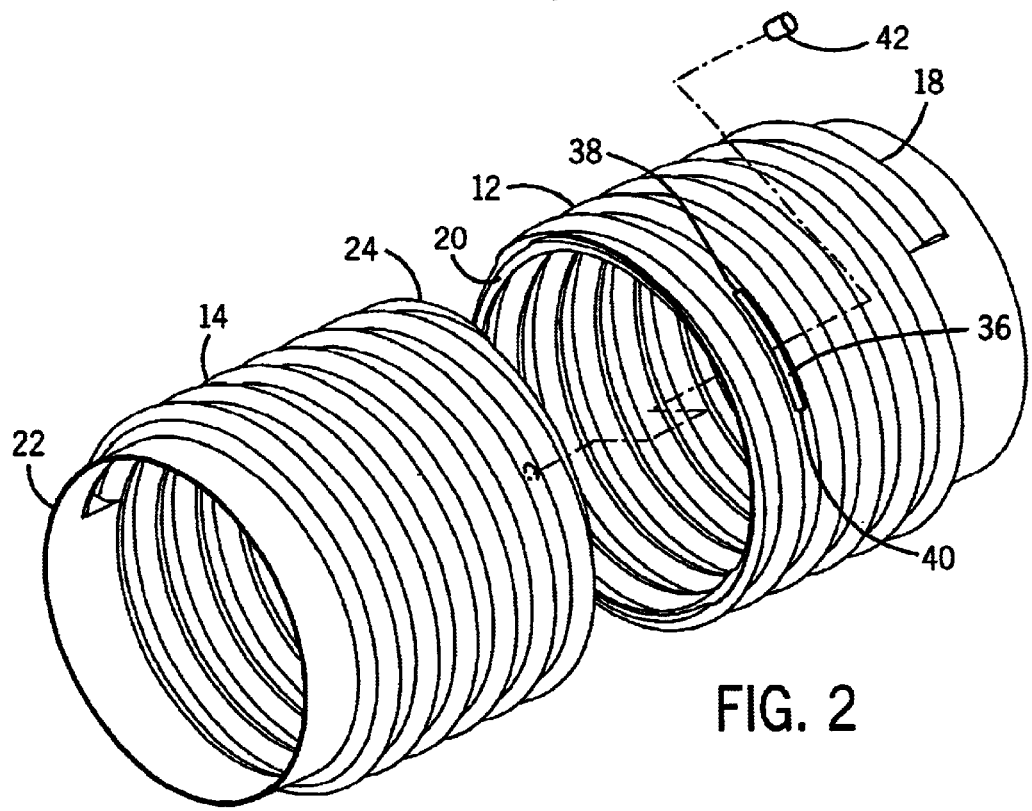
FIG. 2 is an exploded perspective disassembled view of the connector tubing of FIG. 1.
Figure 6:
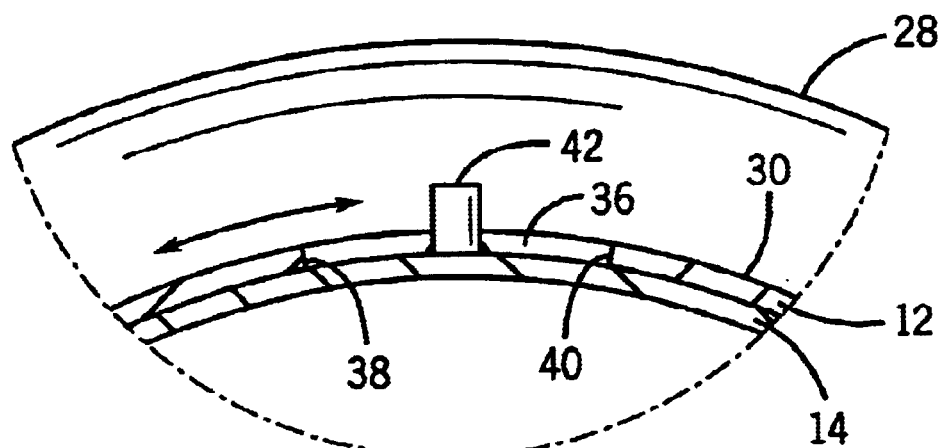
FIG. 6 is a sectional view taken along line 6—6 of FIG. 5.

Tube 12 has an arcuately elongated slot 36 therein, FIGS. 1, 2, 6. The slot has first and second distally arcuately opposite ends 38 and 40. Tube 14 has a boss 42, provided by a stud or pin, welded thereto and extending radially outwardly into and through slot 36 and sliding arcuately therealong during twisting of the tubes relative to each other. Ends 38 and 40 of slot 36 provide stops engageable by boss 42 to limit and control the amount of twisting of the tubes relative to each other, to prevent and control excessive relative rotation. At overlap region 26, tube 12 is the outer tube, and tube 14 is the inner tube. Slot 36 is thus in the outer tube, and boss 42 extends radially outwardly from inner tube 14 through slot 36 in outer tube 12. It is preferred that the limiting stop provided by slot 36 and boss 42 be in one of the noted valleys at the overlap region 26 of the tubes. Boss 42 in valley 30 has a radial height less than the radial height of the adjacent peaks 28, such that the outer profile of the connector tubing at overlap 26 is no greater than the outer profile of peaks 28.

Axis 16 may be rectilinear as shown in FIG. 1, or may be non-rectilinear in various applications, i.e. ends 18 and 20 may not be axially aligned.

It is recognized that various equivalents, alternatives and modifications are possible within the scope of the appended claims.

What is claimed is:

1. Connector tubing comprising a pair of spiral flex tubes comprising a first tube extending along an axis between first and second ends, and a second tube extending along said axis between first and second ends, said first ends being distally axially spaced from each other, said tubes being axially overlapped in nested relation at said second ends and being twistable relative to each other about said axis to provide torsion relief, wherein said first tube has an arcuately elongated slot therein, said slot having first and second distally arcuately opposite ends, and wherein said second tube has a boss extending radially into said slot and sliding arcuately therealong during said twisting of said tubes relative to each other, said first and second ends of said slot providing stops engageable by said boss to limit arcuate travel of said boss along said slot to in turn limit the amount of twisting of said tubes relative to each other.

2. The connector tubing according to claim 1 wherein:
   said tubes axially overlap each other to provide an outer tube and inner tube;
   said first tube is said outer tube, such that said slot is in said outer tube;
   said second tube is said inner tube;
   said boss extends radially outwardly from said inner tube through said slot in said outer tube.

3. Connector tubing comprising a pair of spiral flex tubes comprising a first tube extending along an axis between first and second ends, and a second tube extending along said axis between first and second ends, said first ends being distally axially spaced from each other, said tubes being axially overlapped in nested relation at said second ends and being twistable relative to each other about said axis to provide torsion relief, wherein each said tube is corrugated between peaks and valleys, and wherein said peaks and valleys of said first tube arcuately slide along said peaks and valleys of said second tube at said overlap to permit twisting of said tubes relative to each other and provide said torsion relief, and comprising a limiting stop in one of said valleys at the overlap of said tubes limiting the extent of arcuate travel during said arcuate sliding to in turn limit the amount of twisting of said tubes relative to each other, and wherein said stop comprises an arcuately elongated slot in said valley of said first tube, said slot having first and second distally arcuately opposite ends, and wherein said stop further comprises a boss in said valley of said second tube extending radially into said slot and sliding arcuately therealong during said twisting of said tubes relative to each other, said first and second ends of said slot being engageable by said boss and limiting the arcuate travel of said boss along said slot to in turn limit the amount of twisting of said tubes relative to each other.

4. Connector tubing comprising a pair of spiral flex tubes comprising a first tube extending along an axis between first and second ends, and a second tube extending along said axis between first and second ends, said first ends being distally axially spaced from each other, said tubes being axially overlapped in nested relation at said second ends and being twistable relative to each other about said axis to provide torsion relief, a stop co-acting between said tubes to limit the amount of twisting of said tubes relative to each other, said stop comprising a stopping member and a stopping surface, said stopping member striking said stopping surface and being stopped thereby during rotation of said tubes, said stopping surface facing in a circumferential direction relative to said axis, and comprising a second stopping surface facing in a circumferential direction relative to said axis and circumferentially facing said first mentioned stopping surface and circumferentially distally spaced from said first stopping surface by an arcuate gap therebetween.

5. Connector tubing comprising a pair of spiral flex tubes comprising a first tube extending along an axis between first and second ends, and a second tube extending along said axis between first and second ends, said first ends being distally axially spaced from each other, said tubes being axially overlapped in nested relation at said second ends and being twistable relative to each other about said axis to provide torsion relief, a stop co-acting between said tubes to limit the amount of twisting of said tubes relative to each other, said stop comprising a stopping member and a stopping surface, said stopping member striking said stopping surface and being stopped thereby during rotation of said tubes, said stopping surface facing in a circumferential direction relative to said axis, wherein said stopping surface is on one of said tubes, and said stopping member is on the other of said tubes, and comprising a second stopping surface facing in a circumferential direction relative to said axis and circumferentially facing said first mentioned stopping surface and circumferentially distally spaced from said first stopping surface by an arcuate gap therebetween, both of said first and second stopping surfaces being on the same said one tube.

6. Connector tubing comprising a pair of spiral flex tubes comprising a first tube extending along an axis between first and second ends, and a second tube extending along said axis between first and second ends, said first ends being distally axially spaced from each other, said tubes being axially overlapped in nested relation at said second ends and being twistable relative to each other about said axis to provide torsion relief, a stop co-acting between said tubes to limit the amount of twisting of said tubes relative to each other, said stop comprising a first rotational stop limiting rotation of said first tube in a first rotational direction relative to said second tube, and a second rotational stop limiting rotation of said first tube in a second opposite rotational direction relative to said second tube.

7. The connector tubing according to claim 6 wherein said first rotational stop limits screw-in of said first tube relative to said second tube, and said second rotational stop limits screw-out of said first tube relative to said second tube.

8. The connector tubing according to claim 6 wherein said axis is rectilinear.

\* \* \* \* \*